United States Patent
Van De Laar et al.

(10) Patent No.: US 10,530,820 B2
(45) Date of Patent: Jan. 7, 2020

(54) MULTIPLE USER WIRELESS DOCKING (71) Applicant: KONINKLIJKE PHILIPS N.V., Eindhoven (NL)

(72) Inventors: Franciscus Antonius Maria Van De Laar, Veldhoven (NL); Walter Dees, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/767,026

(22) PCT Filed: Mar. 7, 2014

(86) PCT No.: PCT/EP2014/054416
§ 371 (c)(1),
(2) Date: Aug. 11, 2015

(87) PCT Pub. No.: WO2014/139868
PCT Pub. Date: Sep. 18, 2014

(65) Prior Publication Data
US 2016/0014172 A1    Jan. 14, 2016

(30) Foreign Application Priority Data

Mar. 11, 2013   (EP) .................................. 13158562
Jan. 10, 2014   (EP) .................................. 14150779

(51) Int. Cl.
*H04L 29/06*      (2006.01)
*G06F 3/038*      (2013.01)
*H04W 4/80*       (2018.01)

(52) U.S. Cl.
CPC ........ *H04L 65/4038* (2013.01); *G06F 3/0383* (2013.01); *G06F 2203/0384* (2013.01); *H04W 4/80* (2018.02)

(58) Field of Classification Search
None
See application file for complete search history.

(56) References Cited

U.S. PATENT DOCUMENTS 6,522,646 B1    2/2003  Madonna
8,949,973 B2    2/2015  Nagata
(Continued)

FOREIGN PATENT DOCUMENTS

CN       1869959 A      11/2006
CN     101005494 A       7/2007
(Continued)

OTHER PUBLICATIONS

"EasyMP Multi PC Projection—Operation Guide". Published Jan. 13, 2011.*

(Continued)

*Primary Examiner* — Scott B Christensen (57) ABSTRACT

A host device (200) for wireless communication with multiple dockee devices (220,221,230) is coupled to peripherals (210,211) for rendering audio or video (AV) data. The host has a docking processor for docking dockee devices for providing access to the peripherals. The dockee device has a dockee processor arranged for docking, as a dockee device, with the host device for getting access to the peripherals. The docking processor is arranged for docking at least one primary dockee device (230) and at least one secondary dockee device (220,221). Thereby, to the primary dockee device, control is provided over the peripherals for determining the AV data to be rendered. To the secondary dockee device is transferred the AV data to be rendered via the peripherals. For example a primary dockee device, presenter P, is enabled to control and determine the AV contents that are rendered, whereas secondary devices, attendees A, are enabled to monitor the AV data.

17 Claims, 5 Drawing Sheets

(56) References Cited

U.S. PATENT DOCUMENTS

| | | | |
|---|---|---|---|
| 2002/0051012 A1* | 5/2002 | Gomes | G06F 17/30905 |
| | | | 715/740 |
| 2002/0181686 A1* | 12/2002 | Howard | H04L 29/06027 |
| | | | 379/202.01 |
| 2005/0160479 A1* | 7/2005 | Kubota | H04N 5/74 |
| | | | 726/16 |
| 2008/0034277 A1 | 2/2008 | Hong | |
| 2010/0289906 A1 | 11/2010 | Kaye | |
| 2012/0254773 A1 | 10/2012 | Viswanathan | |
| 2012/0306622 A1 | 12/2012 | Trinh | |
| 2013/0106989 A1* | 5/2013 | Gage | H04N 7/152 |
| | | | 348/14.09 |

FOREIGN PATENT DOCUMENTS

| | | |
|---|---|---|
| EP | 2407218 A2 | 1/2012 |
| EP | 2426903 A1 | 3/2012 |
| WO | WO2012061804 A1 | 5/2012 |
| WO | WO2012117306 A1 | 9/2012 |

OTHER PUBLICATIONS

Specification of the Bluetooth System, "Master Table of Contents & Compliance Requirements" Covered Core Package version 2.1 + EDR, issued: Jul. 26, 2007.

Wi-Fi Alliance Technical Committee P2P Task Group "Wi-Fi Peer-to-Peer (P2P) Technical Specification" Version 1.1, 2010, Wi-Fi Alliance.

IEEE Std 802.11z-2010 Part 11: Wireless LAN Medium Access Control (MAC) and Physical Layer (PHY) Specifications; Amendment 7: Extensions to Direct-Link Setup (DLS), IEEE Oct. 14, 2010.

XMPP "XEP-0174: Serverless Messaging" Nov. 26, 2008.

* cited by examiner

MULTIPLE USER WIRELESS DOCKING

FIELD OF THE INVENTION

The invention relates to a host device for wireless communication with multiple dockee devices, the host device being arranged for coupling to at least one peripheral for rendering audio or video data, the host device comprising a host communication unit for accommodating said wireless communication, a docking processor arranged for docking at least one dockee device for providing access to at the least one peripheral for the dockee device, and the dockee device comprising a dockee communication unit for accommodating said wireless communication, a dockee processor arranged for docking, as a dockee device, with the host device for getting access to the at least one peripheral.

The invention further relates to a dockee device for wireless communication to a host device, a method and a computer program product for wireless communication between a host and multiple dockee devices.

The invention relates to the field of wireless communication, e.g. via Wi-Fi, and more specific to a setup for a wireless docking system having multiple dockees.

BACKGROUND OF THE INVENTION

Wired docking stations for portable electronic devices typically have only a single physical docking connector to dock one device at a time. The docking station may provide the portable device with power and peripheral functions not provided by the device itself, for example a large(r) screen, high(er) quality speakers, mouse and keyboard.

Wireless docking is known, for example, from WO 2012/117306A1. A wireless docking station enables a wireless secured communication between at least one slave device and a master device.

Wireless docking in a system having a host device and dockee devices may be based on using a Wi-Fi (as described in IEEE802.11) based wireless docking station. The wireless docking station may be a wireless docking host (WDH) that enables a mobile device (called dockee) to access to a set of peripherals locally attached through a wire or wirelessly connected to the host device (such as USB mouse, HDMI display, Bluetooth headset) through a set of message exchange protocols over a wireless link (e.g. Wi-Fi). The wireless docking host may provide information about its presence through a Wi-Fi beacon that dockees can use to select and initiate connections with a chosen WDH. Alternatively, Near Field Communication (NFC) tags associated with the WDH or other out of band means (such as using the communications interface from a wireless power system) are used to select and initiate a WDH to dock with.

US2012/0254773 discloses systems and methods for interactive media sharing. Interactive media sharing includes facilitating participation in a session where the session is conducted among a plurality of touch screen user devices (TSUDs) connected to each other and a media server. The method may include sending initial media content to one or more of the plurality of the TSUDs in real time, or receiving edited media content from at least one of the plurality of the TSUDs in real time, wherein the edited media content comprises further media content overlaid on the initial media content.

SUMMARY OF THE INVENTION

The wireless nature of the communication in the wireless docking system allows in principle to connect a plurality of docking devices simultaneously. However, when multiple dockees would try to access a same peripheral, this may cause interference.

It is an object of the invention to provide a system for wireless docking that enables multiple dockees to wirelessly dock to a host device in an easy to use manner, enabling shared usage of A/V peripherals without causing interference.

For this purpose, according to a first aspect of the invention, in the host device as described in the opening paragraph, offering access to a set of attached peripherals, the docking processor is arranged for docking at least one primary dockee device and at least one secondary dockee device, for providing, to the primary dockee, control over at least one peripheral for determining the AV data to be rendered, and for transferring, to the secondary dockee, at least part of the AV data to be rendered, and the docking processor being arranged for, upon instruction of the primary dockee device, controlling the secondary dockee device by at least one of sending a signal to trigger docking of the secondary dockee device;

controlling a disturbance level of the secondary dockee device;

activating an application on the secondary dockee device;

the dockee processor of the secondary dockee device being arranged for being controlled by the primary dockee device by, respectively, at least one of receiving the signal to trigger docking as a secondary dockee, and upon receiving the signal initiating one or more actions to dock to the host device;

upon docking, enabling controlling the disturbance level of the secondary dockee device;

upon docking, enabling activating an application on the secondary dockee device.

For this purpose, according to a second aspect of the invention, the dockee device as described in the opening paragraph comprises a dockee communication unit for accommodating said wireless communication, and a dockee processor arranged for docking, as a dockee device, with the host device for getting access to the at least one peripheral, the dockee processor being arranged for docking as a primary dockee device or a secondary dockee device, for executing, as the primary dockee device, control over the at least one peripheral for determining the AV data to be rendered, and for receiving and rendering, as the secondary dockee device, the AV data to be rendered, and the docking processor of the primary dockee device being arranged for controlling the secondary dockee device by an instruction to the docking processor, to at least one of send a signal to trigger docking of the secondary dockee device;

control a disturbance level of the secondary dockee device;

activate an application on the secondary dockee device; and the dockee processor of the secondary dockee device being arranged for being controlled by the primary dockee device by, respectively, at least one of receiving the signal to trigger docking as a secondary dockee, and upon receiving the signal initiating one or more actions to dock to the host device;

upon docking, enabling controlling the disturbance level of the secondary dockee device;

upon docking, enabling activating an application on the secondary dockee device.

For this purpose, according to a further aspect of the invention, the method as described in the opening paragraph comprises, in the host device, docking at least one dockee device for providing access to at the least one peripheral for the dockee device, the docking including docking at least one primary dockee device and at least one secondary dockee device, providing, to the primary dockee device, control over the at least one peripheral for determining the AV data to be rendered, and transferring, to the secondary dockee device, at least part of the AV data to be rendered, and the docking comprising, upon instruction of the primary dockee device, controlling the secondary dockee device by at least one of sending a signal to trigger docking of the secondary dockee device;

controlling a disturbance level of the secondary dockee device;

activating an application on the secondary dockee device.

For this purpose, according to a further aspect of the invention, the method as described in the opening paragraph comprises, in the dockee device, executing, as the primary dockee device, control over the at least one peripheral for determining the AV data to be rendered, and receiving and rendering, as the secondary dockee device, at least part of the AV data to be rendered, and the method comprising, in the primary dockee device, controlling the secondary dockee device by instructing the docking processor, to at least one of send a signal to trigger docking of the secondary dockee device;

control a disturbance level of the secondary dockee device;

activate an application on the secondary dockee device; and the method comprising, in the secondary dockee device, being controlled by the primary dockee device by, respectively, at least one of receiving the signal to trigger docking as a secondary dockee, and upon receiving the signal initiating one or more actions to dock to the host device;

upon docking, enabling controlling the disturbance level of the secondary dockee device;

upon docking, enabling activating an application on the secondary dockee device.

For this purpose, according to a further aspect of the invention, the computer program product as described in the opening paragraph comprises a program that is operative to cause a processor to perform any one of the methods as described above.

The measures have the effect that dockee devices are now distinguished into primary and secondary docking devices. Primary docking devices will have control over at least one peripheral offered by the host device, whereas the secondary docking devices will be docked and receive at least part of the AV data that is to be rendered via said peripheral controlled by the primary dockee device. Hence the primary dockee device may provide AV data and control said peripheral to render the AV data, whereas the secondary dockee device is enabled to receive all, or a subset of, the AV data as rendered via peripheral controlled by the primary dockee. This is very useful for (ad hoc) meetings, lectures etc. in which easy collaboration and sharing of information is important.

The primary dockee device advantageously controls the secondary devices via the docking processor in the host device, by at least one of sending a signal to trigger docking of the secondary dockee device, controlling a disturbance level of the secondary dockee device, or activating an application on the secondary dockee device. Upon instruction of a primary dockee device, a disturbance level (such as the noise created by an incoming phone call) of one or more dockee devices may be controlled. Advantageously, such control enables the primary device to effectively control the disturbance level in a group of dockees, e.g. in a meeting room/lecture room/classroom. Furthermore, an application may be activated on one or more dockee devices. For example, an application running locally on each dockee will take care of presenting data to the user(s), handling interactivity, setting permissions by the user(s), etc. This application may be preinstalled on the dockee or pushed by the WDH or the primary dockees to the secondary dockees (on which it gets downloaded and installed). The latter option allows for customized applications and/or applications extensions (such as plugins, scripts, content) to be used during the meeting and/or to control the meeting/lecture room infrastructure. The application for the primary docking may be different and/or may have more options enabled than the application provided for secondary dockees. Also, the application may provide an interactive task to the user of the dockee device, e.g. a poll or questionnaire. Furthermore, the respective dockee device may be arranged for, upon docking, enabling controlling the disturbance level of the dockee device, downloading and/or starting an application on the dockee device.

The host may be further arranged to make the AV output for the secondary dockee available as a peripheral for docking (e.g. simulated webcam), that will appear to the dockee as a real peripheral (e.g. USB webcam) through the docking protocol as would normally would happen when a dockee docks with a WDH. So, in effect, the host may offer one set of peripherals to the primary dockee and another set of peripherals, which may include such simulated peripherals for secondary dockees. In that case the secondary docking device may have control and/or access to a secondary peripheral that receives and renders the at least part of the AV data that is rendered via the corresponding primary peripheral without having control and/or access to the primary peripheral.

The invention is also based on the following recognition. Traditionally docking assumes that the dockee gets access to a peripheral so as to control the peripheral to perform its intended function, i.e. the peripheral "as it is". The inventors have seen that the above problems of interference between dockees when attempting to dock to a same peripheral are overcome by distinguishing at least two types of dockees, and providing control over the peripheral to only a primary dockee. The secondary dockee gets a different, restricted access to the peripheral, or, in effect, a different peripheral function is presented to the secondary dockee to represent the access to the original peripheral. For example, the primary dockee gets access to a display, whereas the secondary dockee is enabled to monitor the output on the display by receiving a video data stream of a peripheral similar to a camera function.

Optionally, in the host device, the docking processor is arranged for providing, to the primary dockee device, write access to the at least one peripheral for said determining the AV data to be rendered, and for providing, to the secondary dockee device, read access to the at least one peripheral for transferring at least part of the AV data to be rendered. For example, the read access may be to the original, full resolution AV data, or to a modified, e.g. scaled and/or transcoded, representation of the primary AV data. By providing write access the primary dockee device is enabled to control the peripheral, whereas by getting read access the secondary dockee device is enabled to receive the AV data as rendered via the peripheral. This allows secondary dockees to monitor the merged display output and/or audio output and follow the presentation on their own screen and/or headphones. This is very useful for large meeting/lecture rooms, which may be noisy and where not everyone may have a good clear visibility and readability of the display peripheral(s) being driven by the primary dockee.

Optionally, the docking processor is arranged for docking a dockee device that establishes the wireless communication with the host device, in one or more of the following ways. The docking processor may be arranged for docking a dockee device as a primary or secondary dockee device without prior identification data (e.g. of the device or its user) or a user pairing action. This enables any dockee device within range to easily dock without preparatory steps (such as sending invitation E-mails to everyone). The docking processor may be arranged for docking a dockee device as a primary or secondary dockee device based on prior identification data or a user pairing action. This enables forming a group of dockee devices as prepared, or sharing some common information, or having some user input like confirmation or registration data. The docking processor may be arranged for docking a dockee device as a primary dockee device that communicates an identification code corresponding to a primary verification code in the host device. This enables verification by the host device before docking. The docking processor may be arranged for docking a dockee device as a secondary dockee device upon permission from a primary dockee device. This enables a primary dockee device to control the docking of other dockees. The docking processor may be arranged for docking multiple dockee devices as multiple secondary dockee devices upon a single permission from a primary dockee device. This enables forming a group of dockees based on a single permission of a primary device. The docking processor may be arranged for docking a primary or secondary dockee device based on identification with an identification token. A typical example would be the use of an NFC token containing docking credentials.

Optionally, the docking processor is arranged for managing a meeting of participants based on docking a multitude of dockee devices as dockee devices coupled to participants, the multitude comprising at least one primary dockee device. The docking processor now has an additional function to manage a group of dockees, i.e. a number of dockee devices within wireless radio range, so as to form a meeting of participants, e.g. in a meeting hall or classroom. The docking processor may be arranged for at least one of counting a number of participants to the meeting based on the number of dockee devices; registering a participant to the meeting based on data received from the dockee device; registering at least one presenter corresponding to the primary dockee device; distributing meeting data to the participants of the meeting; distributing meeting data as controlled by the at least one primary dockee device. Wireless radio range may be taken as is or set to be limited on purpose for performance or privacy reasons, for example, by setting a threshold on the received signal strength (RSSI) and/or setting a threshold on the number of MAC layer (L2) retransmissions. Advantageously, one or more of the above functions enable conveniently organizing a meeting and/or sharing data.

Optionally, the docking processor is arranged for docking multiple primary dockee devices. Furthermore, the docking processor may be arranged for providing, to the multiple primary dockee devices, shared control over the at least one peripheral for determining the AV data to be rendered. The shared control may for example enable multiple primary dockees to control the volume of a shared loudspeaker system. Furthermore, the docking processor may be arranged for managing shared AV output for the multiple primary dockee devices by providing at least one of split screen, overlaying, at least one window, video scaling, audio mixing. This shared control may for example enable multiple primary dockees control a shared A/V output peripherals (such as TV or beamer) in a meeting room.

Optionally, the docking processor is arranged for, upon instruction of a primary and/or secondary dockee device, transforming a secondary device into a primary dockee device, or a primary dockee device into a secondary device. Advantageously, in a group of dockees, the assignment of the primary and secondary dockee function can be modified later. Furthermore, the docking processor may be arranged for accommodating direct communication between two dockee devices, for example to enable an exchange of questions and answers, or data. Such direct communication may be applied to enable messaging as a user function. Furthermore, the docking processor may be arranged for assigning multiple dockee devices to a group and accommodating direct communication between dockee devices of the group. Within such group, all members are now enabled to communicate. Also, a number of groups and/or subgroups may be formed having respective communication facilities. Furthermore, the docking processor may be arranged for sharing of content or messages between all dockee devices. Furthermore, the docking processor may be arranged for using local network broadcast or content scaling for transferring shared content to multiple dockee devices.

Furthermore, the docking processor may be arranged for undocking at least one, a group, or all, of the dockee devices. Such undocking enables the primary dockee to terminate a session, meeting or group.

Optionally, the at least one peripheral comprises at least one of a set of output peripherals like a beamer, a smartbord, a display screen, a loudspeaker system; or at least one of a set of input peripherals like a mouse, room control unit; or a bidirectional peripheral like a data storage unit.

Further preferred embodiments of the device and method according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

Wireless docking is about enabling portable devices (so called wireless dockees or WDs) to wirelessly connect to a group of peripherals, so that applications on the portable device can make use of these peripherals to improve the experience and productivity of working/inter acting with these applications. The grouping of peripherals, the discovery/advertisement of groups of peripherals, managing the connections to groups of peripherals, is performed by a so-called wireless docking host (WDH), which makes its functionality available through a wireless docking protocol.

Possible wireless dockees include (but are not limited to) dockee phones, laptops, tablets, portable media players, cameras, electronic watches. Possible WDHs include (but are not limited to) dedicated wireless docking station devices, display devices, audio devices, printers, PCs. The wireless docking host may also be a small (PC like) dongle with a display, USB and audio interface. Possible peripherals include (but are not limited to) wireless mice, keyboards, display devices, audio devices, webcams, printers, storage devices, USB hubs. These peripherals are considered to support standards such as Wi-Fi Serial Bus and Wi-Fi Miracast to make their functionality available through the wireless network to other devices such as dockees and WDHs. Wired peripherals may be connected to the wireless host.

Figure 1:
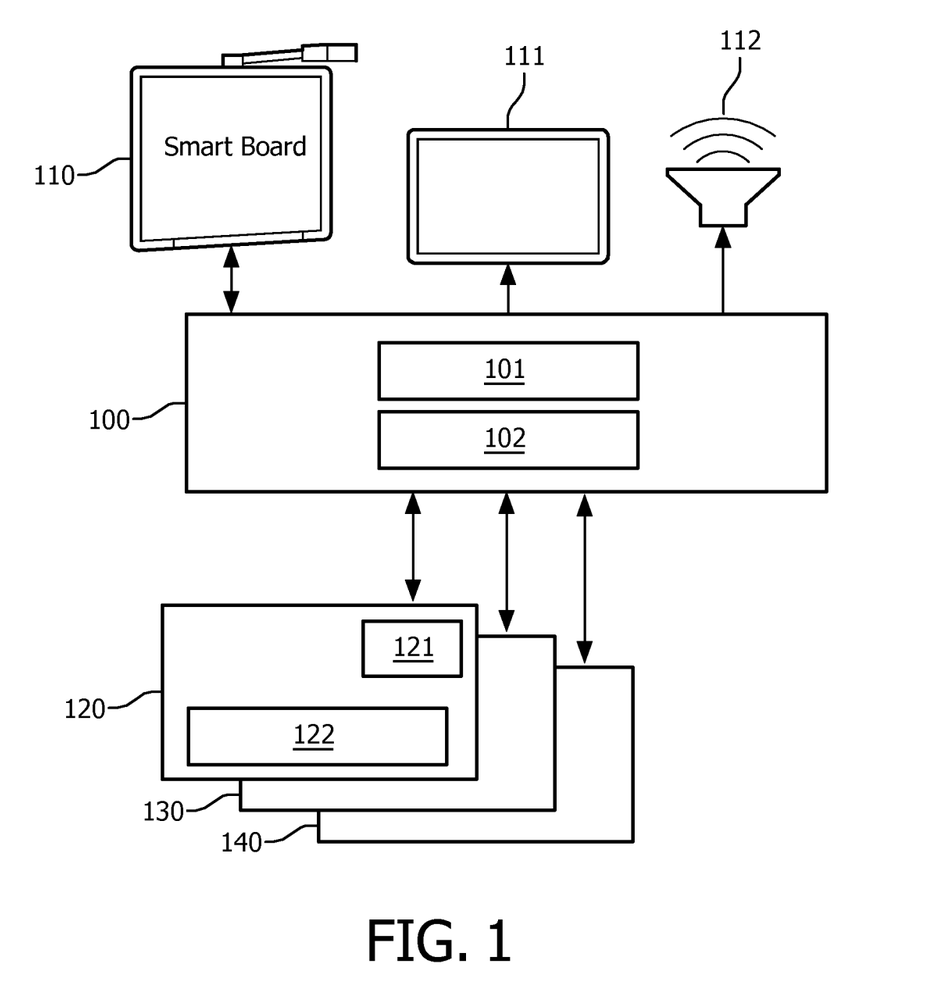
FIG. 1 shows a wireless docking system.

FIG. 1 shows a wireless docking system. The system includes a host device 100 for wireless communication with multiple dockee devices 120,130,140, for example mobile phones, laptops or tablet computers. Only the first dockee device 120 is described in detail below, but further dockee devices have similar components and functions. The host device is coupled to a number of peripherals 110,111,112 for rendering audio or video (AV) data. It is noted that in this document AV data is used for any type of video data, audio data or a combination of video and audio data. The peripherals may include video output devices like a beamer or a display screen 111, graphical input/output devices like a smartboard 110 or a touch screen, audio output devices like a loudspeaker system 112 or a headphone, user control devices like a mouse or a room control unit; data processing devices like a data storage unit or a printer.

The host device 100 has a host communication unit 102 for accommodating said wireless communication, for example a WiFi unit, well known as such. The host device further has a docking processor 101 arranged for docking at least one dockee device. The process of docking a wireless device to a wireless docking host (WDH) is a process of establishing a data link via the available radio channel such as WiFi or Bluetooth, and is known as such as discussed above with reference to WO 2012/117306A1. A description of Bluetooth can be found, for example, in Bluetooth Specification, Core Package version 2.1+EDR, issued: 26 Jul. 2007. The docking process involves providing access to one or more peripherals for the dockee device.

The dockee device 120 has a dockee communication unit 121 for accommodating said wireless communication with the host. In practice, there may be multiple communication units for that purpose, for example Bluetooth, Wi-Fi and 60 GHz. The dockee device further has a dockee processor 122 arranged for docking, as a dockee device, with the host device for getting access to the at least one peripheral.

The docking processor has the following functions. The docking process is arranged for docking at least one primary dockee device 120 and at least one secondary dockee device 130. The primary and secondary dockee devices are different in that different access is established to at least one peripheral, so different sets of access rights and peripheral functions are assigned to each of said first and second dockees. In particular, to the primary dockee device, control is provided over the at least one peripheral for determining the AV data to be rendered. To the secondary dockee device, the AV data to be rendered via the at least one peripheral is additionally transferred so as to enable monitoring the AV output data locally at the secondary dockee, e.g. rendering video on the display of the dockee device.

The dockee processor has the following functions. The docking process is arranged for docking as a primary dockee device or a secondary dockee device, as described above. In particular, when docked as the primary dockee device, the dockee processor executes control over the at least one peripheral for determining the AV data to be rendered. When docked as the secondary dockee device, the dockee processor receives the AV data to be rendered via the at least one peripheral. So the AV data which is rendered via the peripheral coupled to the host is also transferred to the secondary dockee so as to enable rendering on the dockee device, and so monitoring the AV data that is rendered via the host peripheral.

Distinguishing between different types of dockees opens a whole new range of applications in which multiple users can easily share information, collaborate, perform tasks together, etc, without unpredictable interference when accessing specific peripherals. Applications include the possibility of adding local interactivity between users of the wireless docking station, and provide a method and devices for multi user wireless docking in meeting rooms, lecture rooms and classrooms.

When multiple people come together during a meeting or lecture, there's a need to exchange information, collaborate, share meeting results such as meeting notes, presentations, whiteboard or smartboard contents. Furthermore there is a need to easily switch presenters, conduct polls/surveys/exams, generate a presence list, share agenda's etc. Current meeting rooms, lecture rooms, class rooms are set up in such a way that only a single person in the room has his laptop physically connected to a peripheral e.g. a beamer using a video cable to present some content from his laptop. Such setup lacks interactivity and collaboration options, and does not provide easy sharing of content. Also switching presenters is cumbersome and has physical restrictions (e.g. due to the length of the video cable). Wireless technologies, such as Wi-Fi Miracast and wireless docking may help to overcome some of these restrictions and will free people from using cables. However, although Wi-Fi Miracast and wireless docking may solve the issue of linking wirelessly to peripherals, these technologies lack possibilities necessary for collaboration, sharing and interactivity.

Web conferencing applications such as Livemeeting may be used to provide interactivity, sharing and collaborating between the meeting participants. However, setting up a Livemeeting requires administration of users and their E-mail addresses in advance, requires a central server (and an expensive service/license), requires everyone's Internet/E-mail to be up and running, requires everyone to login to, using passwords/participant codes etc. This makes it cumbersome for users to set up. These technologies are also designed for remote (co)operation, and hence they do not take into account the constraints from local wireless operation.

By using wireless docking enhanced by the above docking process for creating different types of dockees, the interactivity, collaboration and sharing during meetings/lectures, and the ease of use of setting up such meetings can be significantly improved. The system enables multiple dockee devices (such as smartphones, laptops, tablets) to be simultaneously docked to a wireless docking host (WDH) which is connected to a set of peripherals (such as display, mouse, shared local storage, lights/blinds controls, internet connection), while the dockee devices are distinguished between primary and secondary docking devices. Primary dockee devices will have direct access to the peripheral functions offered by the WDH, whereas the secondary dockee devices will be connected to the WDH to enable monitoring selected AV data. Hence the dockee devices docked as secondary dockee are able to monitor output (e.g. merged display output) of the primary devices to the peripherals. The WDH may further be configured to enable:

Automatic docking with multiple docking devices within reach of the local network without registration or administration, and without needing to know everyone's contact details in advance.

Automatic docking with multiple docking devices within reach of the local network based on preset registration or administration Automatic local presence detection, and automatic counting and registration of meeting participants.

Sharing of content and messages between all docked devices in a bandwidth efficient manner without the need of a central web server on the Internet, by using local network broadcast (or multicast) and content scaling for applicable content.

Interactivity and collobaration between the users of primary docking devices (presenters) and secondary docking devices (attendees) without the need of a central web server.

Audio services in a lecture/class room using headphone and microphone of personal docking devices.

Secure local handover of central peripherals (screen, beamer, whiteboard, speakers) in a simple and sensible way.

Managing (attendee's) docking device permissions from a primary docking device.

Automatic undocking of all participants from a primary docking device.

A central element in the wireless docking system is the wireless docking host (WDH) device that enables handling simultaneous wireless docking of multiple docking devices (Dockees). The multiple dockees are connected simultaneously to the WDH, the WDH managing a set of wired and/or wireless peripherals and provides dockees access to these peripherals through a set of wireless messaging and streaming protocols, whereby the WDH distinguishes the multiple dockees between primary dockees and secondary dockees, for example a presenter and attendees. The primary dockee is provided access by the WDH to a set X of the peripherals or peripheral functions different from the set of peripherals Y being made available by the WDH to secondary dockees.

It is noted that the difference between the primary and secondary dockees may include having either access or no access to a particular peripheral. Moreover, primary dockees may have a different type of access to a specific peripheral, in particular write access. The primary dockees may have read and write access to a display screen and/or audio, while the secondary dockees may only have read access. For example such difference may apply for the lecture room use case and for the meeting room use case. So the system enables to share a peripheral by enabling different types of access to a same peripheral. Other peripherals may be shared by subdividing the capability, e.g. a shared storage peripheral may be made available in small sections to respective secondary dockees. Moreover, the A/V output may be offered to a secondary dockee through a simulated peripheral (e.g. simulated webcam) that would appear to the dockee as if it were a normal peripheral.

In an embodiment of the docking system, the WDH is configured to enable all dockees to have an IP connection that enables all dockees connected to the WDH to communicate with each other using local network broadcast/multicast and unicast messages. The benefit of doing this is that it allows primary dockees to be able to present content using the peripherals connected to a WDH, such as a large screen and a USB presentation remote control, and that other people in the meeting/lecture room can connect to the presenter and to each other for all kinds of collobaration and interaction purposes. The primary dockee/presenter can use the local network created between the secondary dockees to send for example poll/multiple-choice/survey questions or push content such as lecture notes, weblinks and agenda items to the attendees. The attendees may answer questions and send messages to one another.

In an embodiment of the docking system, the primary and secondary dockees are enabled to send messages and content to each other using a common (decentralized) messaging service over the local network created by the dockees being docked simultaneously to the WDH. This allows the dockee users to collaborate, interact, share content with each other during the meeting/lecture.

In an embodiment of the docking system, the WDH device is further configured to create and provide a video and/or audio stream representing the video and/or audio output that is sent by primary dockees to the one or more display and/or audio peripherals. This allows all dockees (primary and secondary) to monitor the merged display output and/or audio output and follow the presentation on their own screen and/or headphones. This is very useful for large meeting/lecture rooms, which may be noisy and where not everyone may have a good clear visibility and readability of the display peripheral(s) being driven by the primary dockees, and is useful to get better visibility and control over the screen for users of other primary dockees who may wish to simultaneously share the screen in order to collaborate.

In an embodiment of the docking system, the WDH device is further configured to receive audio streams from primary and/or secondary dockees to be rendered and/or mixed via the audio output of an audio peripheral so that all people in the room can hear it. This gives dockee users the opportunity to ask or answer questions using the microphone of their docking devices, which is very useful for noisy environments and large meeting/lecture rooms where a lecturer/presenter may otherwise not hear the question properly.

In an embodiment of the docking system, the WDH device may send a signal to trigger docking of secondary dockees, after which a dockee device upon receiving the signal initiates one or more actions to dock to the WDH. For example, signal may be exchanged via the Wi-Fi Direct Services framework. A dockee may offer a service which is made discoverable via Wi-Fi Direct. The WDC may discover the service via a Probe Request and GAS frames. Subsequently, the trigger signal may comprise a provision discovery request and a REQUEST_SESSION message to invite the dockee to dock. The benefits of having such signal is that everyone in the meeting room gets actively invited to dock with the WDH in order to collaborate, easily share meeting materials/results, do exams, manage the disturbance level and so on. Additionally, no pre-registration or administration may be required for dockee devices to become (primary and/or secondary) docking devices. Contact details, e.g. E-mail addresses, may be exchanged automatically or on request or upon consent of the user of the dockee device. Furthermore, the system may send the signal only to a subset of the dockees within range, meeting one or more selection criteria. This benefit of doing so is to make sure that only those dockees of which the users are involved in the meeting/lecture get invited to dock, and not too many other people in the vicinity of the WDH, e.g. people that just happen to walk by the meeting/lecture room.

In an embodiment of the docking system, a primary dockee device is enabled to send a message to the WDH to trigger the WDH to send the signal for secondary dockees to initiate docking. When direct communication to other dockee devices is available, the primary dockee device may send a docking request or command directly to other dockee device in reach. The benefit of this is that a lecturer or chairman has control over when other people are enabled to participate.

In an embodiment of the docking system, secondary dockees do not need to perform active user pairing to set up a connection. This makes it easy for everyone in the meeting room to set up a connection with the WDH.

In an embodiment of the docking system, the WDH device enables primary dockees to make or add a secondary dockee as primary dockee and/or to allow these secondary dockees to have a further or different type of access to the peripherals. This enables easy switching and collaboration between presenters during the meeting and avoids handing over and plugging in VGA cables which typically take a long time before it is all up and running again.

In an embodiment of the docking system, the WDH device enables primary dockees to undock all participants from the WDH device. This enables an easy way for everyone to undock at the end of the meeting/lecture.

In an embodiment of the docking system, a dockee device may connect to the video and/or audio stream provided by the WDH that represents the video and/or audio output that is sent by primary dockees to the one or more display and/or audio peripherals, the dockee device rendering the respective stream being received on its screen and/or audio output devices. This allows all dockees (primary and secondary) to monitor the merged display output and/or audio output and follow the presentation on their own screen and/or headphones. This is very useful for large meeting/lecture rooms, which may be noisy and where not everyone may have a good clear visibility and readability of the display peripheral(s) being driven by the primary dockees, and is useful to get better visibility and control over the screen for users of other primary dockees who may wish to collaborate and share the screen.

In an embodiment of the docking system, a dockee device may create and provide an audio stream from the input signal from one or more of its audio input devices (e.g. microphone), and send it to the WDH. This gives dockee users the opportunity to ask or answer questions using the microphone of their docking devices, which is very useful for noisy environments and large meeting/lecture rooms where a lecturer/presenter may otherwise not hear the question properly.

In an embodiment of the docking system, a dockee device may automatically search for a signal coming from the WDH to initiate docking. Said searching for such a signal may start after being triggered by the user, after which upon receiving the signal initiates one or more actions to dock to the WDH. The first option has the benefit that it always enabled and always works, the second option has the benefit of requiring less battery power.

In an embodiment of the docking system, various dockees receive different sets of peripheral functions that can be accessed. In particular, the host, e.g. a PC, may make available to dockee shared peripherals as well as exclusive peripherals, whereby exclusive peripherals (i.e. peripherals that can only accept or provide data from/to a single source) may be handled as follows:

1) a window on a display may be made available instead of the entire display. Effectively, the exclusive display is made into a shared peripheral. When a dockee is in focus, the mouse/keyboard control is assigned to that dockee;

2) a hotkey is provided to switch between dockees, or to a host PC itself, for using a display in full screen;

3) a method that allows a WDH to forcefully release peripherals from a dockee and give them to another dockee.

Figure 2:
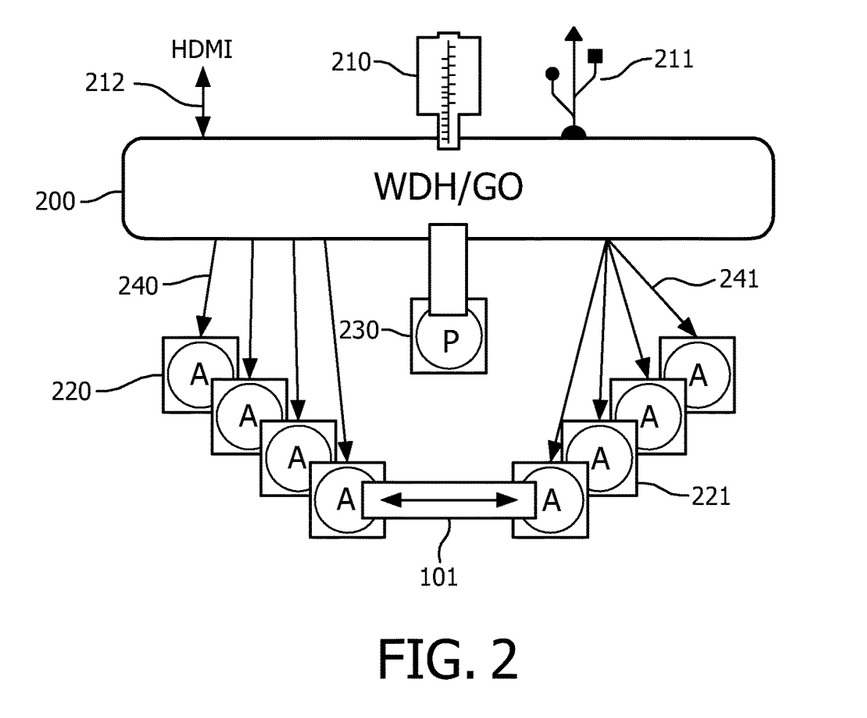
FIG. 2 shows an example of a docking system having a wireless docking host, primary and secondary dockees.

FIG. 2 shows an example of a docking system having a wireless docking host, primary and secondary dockees. The figure shows a Wireless Docking Host (WDH/GO) 200 connected to a set of peripherals, for example a display, audio speakers, and other peripherals. Further peripherals may also be used via peripheral interfaces, like an Ethernet connection 210 for high speed access to peripherals or internet access to be used by the primary (and optional secondary) dockees, a USB interface 211 which may support multiple peripheral connections, or HDMI 212. A primary dockee device (a presenter P) 230 is shown to send data to the host, typically with a unicast signal. A first set of secondary dockee devices (attendees A) 220 is shown to receive individual data from the host, for example by unicast signals 240. A second set of secondary dockee devices (attendees A) 221 is shown to receive the same data from the host, for example by a broadcast signal 241. The figure also shows direct wireless communication between a secondary dockee device form the first set 220 and the second set 221 by arrow 101, for example unicast messages.

In a practical example as illustrated by the figure, a set of dockees is simultaneously connected to the WDH using Wi-Fi Direct, whereby the WDH is a Wi-Fi Direct Group Owner (GO) as known from Wi-Fi Direct. Different topologies may include:

1) Separate group for secondary dockees
2) Separate groups for each dockee
3) Separate group for peripherals A primary dockee/presenter P can use the WDH peripherals for giving a presentation to multiple attendees. The secondary dockees indicated by A together may form a messaging group which allows them to interact, share content and send messages to each other, e.g. through routing or bridging IP traffic. The WDH provides an A/V stream representing the output being sent by presenter P to the WDH peripherals. This allows the users of the secondary dockee devices to follow the presentation (audio and/or video showing slides, smartboard contents, chats, etc.) on his or her own portable docking device, in addition to following the presentation by looking at and/or listening to the WDH peripherals. The primary dockee/presenter can use the local network created between the secondary dockees to send for example poll/multiple-choice/survey questions or push content such as lecture notes, weblinks and agenda items to the attendees. The attendees may answer questions and send messages to one another if needed or permitted. When needed, the primary dockee/presenter can handover the WDH peripherals to another presenter. At the end of the presentation(s) all (attendees) secondary devices can be undocked at once by the last presenter.

The description below provides further practical embodiments and implementation options using Wi-Fi Direct (a.k.a. Wi-Fi Peer to Peer), known from the document "Wi-Fi Wi-Fi Peer-to-Peer (P2P) Technical Specification, Version 1.1, 2010", from the Wi-Fi Alliance. Wi-Fi Direct is a standard that allows Wi-Fi devices to connect to each other with no need for a wireless access point. Wi-Fi Direct plays an important role for connecting standalone wireless devices and peripherals, such as display devices/peripherals supporting Wi-Fi Miracast, and I/O devices/peripherals supporting Wi-Fi Serial Bus (e.g. wireless mouse, keyboard, printer, USB hub). It is therefore an important technology for wireless docking, a technology to enable a portable device to connect to a multitude of wireless peripherals. In Wi-Fi Direct, a user pairing step typically needs to be performed for every new Wi-Fi Direct connection that is created. When two Wi-Fi Direct devices want to communicate, one of them becomes the so-called Group Owner (GO). The other device takes the client role. Together they form a so-called P2P group. If all Wi-Fi Direct devices in the group connect to the same GO, and if the GO supports the so-called Intra-BSS distribution feature of Wi-Fi Direct, it is sufficient for the other wireless device to connect to this GO to be able to communicate with all the devices in the group. An Intra-BSS Distribution field indicates if a device is hosting, or intends to host, a Group that provides a data distribution service between clients in the Group.

A GO has many similarities with an AP. It may for example allow other devices to join the P2P group, and offer possibilities to distribute traffic between the different devices in the P2P group. However, as mentioned before, it is beneficial that devices would be able to communicate directly with each other without having to relay traffic. In case of Wi-Fi Direct this would mean that you would have to connect to and pair with each of the other devices individually. This is cumbersome, especially if multiple devices are involved. For example, for wireless docking of a portable device with a multitude of wireless peripherals, it would be very user unfriendly if the user would need to perform a user pairing step with each wireless peripheral individually. It is therefore very important to keep the amount of pairing actions to a minimum.

Tunnelled Direct Link Setup (TDLS), known from the document "IEEE Std 802.11z-2010 Part 11: Wireless LAN Medium Access Control (MAC) and Physical Layer (PHY) specifications, Amendment 7: Extensions to Direct-Link Setup (DLS), published by IEEE on 14 Oct. 2010", is a option in Wi-Fi that enables setting up a direct link between two devices that are both connected to the same Wi-Fi Access Point or Wi-Fi Direct GO, without needing to pair again to set up a secure direct connection. This is done as follows. Once a TDLS enabled Wi-Fi Device is connected to the AP, it can send a request to another TDLS enabled device that is connected to the same AP to set up a direct connection. After exchanging information such as the security credentials and information about which Wi-Fi channel to use, the two devices can start a private secure direct link between the two devices.

In one embodiment, a host device is connected to a set of wired and wireless peripherals and makes their function available to client devices over a wireless network (such as Wi-Fi) through a set of network messaging and streaming protocols (so called peripheral function protocols). Example peripheral function protocols include Wi-Fi Miracast, Wi-Fi Serial bus, WiGig Bus Extension, UPnP/DLNA media streaming, Internet Printing Protocol, Airplay, Wi-Fi Direct Print/Play/Display/Send Service etc. The discovery, connection management/optimization, and control of these peripheral functions and host device is further facilitated by a so-called wireless docking protocol between the host device (called a Wireless Docking Host or WDH) and a client device (called a Dockee).

In an embodiment, the WDH acts as a group owner (GO) supporting Wi-Fi direct intra BSS mode for supporting mutual communication between the dockees. All dockees are connected to the WDH using Wi-Fi Direct. Since the WDH is a GO it may offer a DHCP server to provide the dockees with an IP address for communication within the Wi-Fi Direct network. In an alternative embodiment, the dockees and WDH are connected to the same WLAN access point (AP), whereby broadcast messages are enabled and all connections between the dockees and between the dockees and the WDH are at most single hop connections and may be based on TDLS. Zero configuration networking may be used for local IP address generation and name based services, as an alternative to using DHCP. The WDH may also be integrated with the WLAN AP, and may support a DNS server. The WDH may further be configured to maintain a list of at least two different classes of dockee, said primary and secondary dockees.

After or whilst a dockee connects to the WDH, the WDH determines for each dockee to which class it belongs, by identifying each dockee and or its user. In one embodiment, the first dockee that docks with the WDH automatically becomes a primary dockee. In another embodiment, dockees having special credentials (e.g. having a trusted certificate or higher authorization level) or dockees part of specific predetermined set become a primary dockee. Alternatively, the WDH has some user interface (UI) means of making a dockee a primary dockee. All other dockees typically become secondary dockees, unless a user of a primary dockee or a user of the WDH allows a secondary dockee to become a primary dockee. When docking, or becoming a primary and/or secondary dockee, an application (so called app) may be downloaded and/or started automatically, on request/permission, or under control of primary dockee, as described above.

In a further embodiment, the WDH enables primary dockees to push messages, send poll/multiple-choice/survey questions, agenda items, captured whiteboard content or documents from the primary dockee to other dockees, and collect responses if applicable possibly using a time-out limit for responses. In a further embodiment, the WDH enables P2P message exchange between dockees, e.g. using the XMPP instant messaging framework. For this feature the WDH may function as a Dynamic Name Server for the IM clients.

In a further embodiment, the set of peripherals contains one or more display peripherals. The WDH may be configured to provide a video stream representing the output that is sent by the primary dockees to the one or more display peripheral. If two or more primary docking devices send output to the same display peripherals simultaneously, the display output may be merged by the WDH using split screen, PIP, overlay or any other means of audio and video mixing, scaling and/or re-encoding. The WDH may also enable dockees to monitor the output of the primary dockees to the audio peripherals through an audio stream provided by the WDH.

Figure 3:
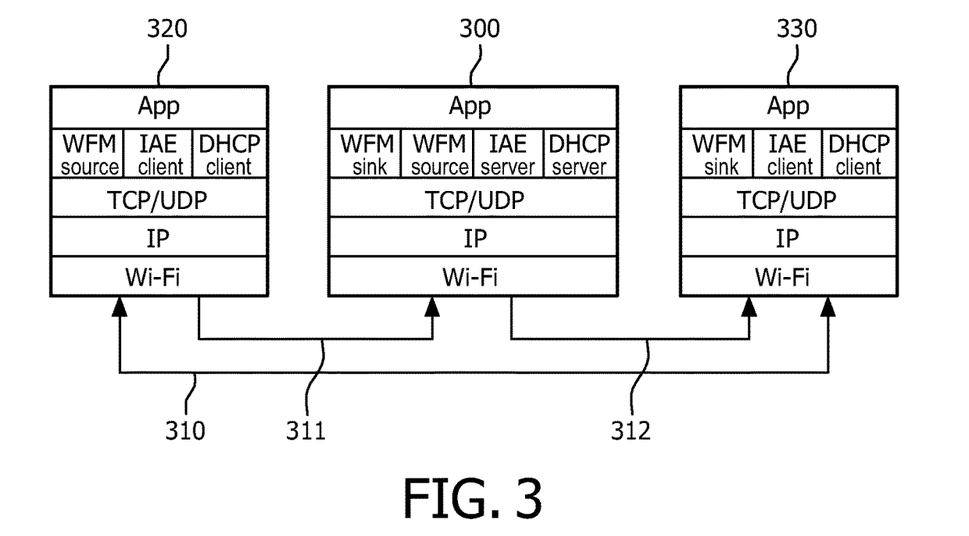
FIG. 3 shows an example of a communication structure in a wireless docking system.

FIG. 3 shows an example of a communication structure in a wireless docking system. In the structure, a wireless docking host 300 is shown to have wireless communication with a primary dockee 320 for receiving AV data via a unicast link 311, and with a secondary dockee 330 for transferring AV data via a broadcast link 312. The primary and secondary dockees are shown to directly communicate via a unicast link 310. Each of the devices is schematically depicted by a communication protocol stack, having a lowest layer of the Wi-Fi protocol, a next layer of an internet protocol (IP), a next layer of a TCP/UDP protocol. The host 300 has a next layer comprising a Wi-Fi Miracast (WFM) sink and a WFM source capability, an interactive activity engine (IAE) server, and a DHCP server function. In the host the separate WFM sink and source functions are provided because the sink is intended for the primary WFM source and the source is intended for the secondary WFM sink(s). In an embodiment the WFM source of the WDH may be represented as a WFM peripheral for the secondary dockee(s). Also, the WFM source of the WDH may be replaced by a WSB video peripheral (e.g. a simulated webcam) or as a video component stream for a web browser or a messaging service client.

On top of the structure there is an application layer that may accommodate one or more applications (computer programs usually called Apps). The primary dockee 320 has a next layer comprising a Wi-Fi Miracast (WFM) source capability, an interactive activity engine (IAE) client, and a DHCP client function. On top there is an application layer that may accommodate one or more applications (computer programs usually called Apps). The secondary dockee 330 has a next layer comprising a Wi-Fi Miracast (WFM) sink capability, an interactive activity engine (IAE) client, and a DHCP client function. On top there is an application layer that may accommodate one or more applications (computer programs usually called Apps).

The figure illustrates a primary dockee running a docking application using Wi-Fi Miracast (WFM) over IP and connected to a WDH functioning as group owner (GO) in a Wi-Fi Direct network, for example in intra BSS mode. The primary dockee will function as a WFM source and the WDH as both a WFM sink and source. In order to allow the secondary dockee(s) to function as a WFM sink the WDH should forward the WFM packets in broadcast mode. Optionally the WDH may scale the audio/video data to constrain bandwidth.

Interactive messaging between dockees (including polls/quiz/survey) may be added using an Inter-Activity Engine (IAE) at application level. The IAE may be based upon or derived from XMPP (extensible Messaging and Presence Protocol) without requiring a server as described in the "XMPP XEP-0174: Serverless Messaging" document available via http://xmpp.org/extensions/xep-0174.pdf, but instead the WDH provides DHCP server functionality and may provide DNS server functionality. Other standardized or proprietary protocols instead of XMPP are also possible for example SIMPLE (Session initiation protocol for Instant Messaging and Presence Leveraging Extensions) or IRC (Internet Relay Chat) or Wi-Fi Direct Services framework to share content using its Send service.

In another embodiment, the WDH may enable primary dockees to provide output to the WDH and/or its audio peripherals through an audio stream between the dockee and the WDH. This may be based on WSB Audio, Wi-Fi Direct Play Service, VoIP, XMPP, Skype, DLNA or other audio streaming mechanism. The WDH can mix this with the audio output for the audio peripherals so that all people in the room can hear it.

In another embodiment, the WDH or a primary dockee may send a signal to trigger docking or undocking of secondary dockees, after which upon receiving the signal the dockees initiates one or more actions to dock to the WDH. Such actions may include one or more of the following:

automatically initiate docking (which may or may not be permitted by the user of the dockee);

automatically start up a docking application (which may or may not be permitted by the user);

ask the user confirmation to dock;

remind the user or provide instructions to the user to dock. The signal may be in the form of:

a Wi-Fi (beacon or probe request/response) information element being sent through Wi-Fi Direct (e.g. as part of the Wi-Fi Direct pre-association device or service discovery information, or as part of a PBC pairing signal);

a broadcast message (e.g. on the MAC or IP layer, e.g. similar to "wall" in Linux) being sent to all the dockees associated with the same Wi-Fi direct network or with the same WLAN AP as the WDH;

unicast message sent to a TCP/IP port on the dockee;

a session initiation event within the Wi-Fi Direct services framework sent from the WDH to the dockees (e.g. by performing a SeekService request to search for dockees, followed by a SessionRequest, which the dockee's docking service can then accept or not (possibly based on requesting user input));

messages using non-Wi-Fi signals such as coded light, Bluetooth messages.

In a further embodiment, sending the signal by the WDH to trigger docking of secondary dockees is initiated by a primary dockee, for example by sending a command to the WDH.

In a further embodiment, a method and system is provided whereby docking is only allowed based on prior identification data, a specific verification signal or user pairing input. For example, a signal may only sent by the WDH to a subset of the dockees within range, and/or meeting one or more selection criteria. For example, only:

dockees within line of sight of the WDH (e.g. using coded light, beam forming), dockees within Bluetooth range, dockees with a certain Wi-Fi and/or other wireless signal/field strength.

dockees that can be detected through presence detecting by the WDH (e.g. using webcam, IR sensor), dockees with a previously established trust relation.

dockees with a predefined application installed, possibly having/exposing a specific application configuration or identifier.

dockees connected to the same AP or Wi-Fi Direct network dockees which respond to the signal (e.g. by initiating a pairing action, or by sending a docking protocol related message) within a certain timeframe after sending the signal dockees with an IP or MAC address within a certain predetermined set.

dockees providing information about the user (e.g. E-mail address, name) matching a certain predetermined set.

In a further embodiment, dockees may automatically do a regular active search for such signal, or may search for such a signal only after being initiated by the user or the system (e.g. based on contextual information such as noise, or when an NFC/Qi/Wi-Fi/Bluetooth signal related to the WDH or the room the WDH is located in is detected).

In a further embodiment, secondary dockees do not need to perform active user pairing to set up a connection. This may be achieved for example by automatically initiating and accepting WPS push button pairing requests, or by defining a default well-known PIN, or by performing out of band provisioning or by using a TDLS connection instead of a Wi-Fi Direct connection. However, the dockee may be required to enter a password to be able to access the audio and video streams provided by the WDH to monitor the meeting, and to take part in the message exchange, or only able to get access if it meets one or more of the above mentioned selection criteria.

In a further embodiment, the WDH or primary dockees can set permission(s) for application features on other primary or secondary dockees. In one particular embodiment, primary dockees can set permissions to manage the disturbance level of other dockees, by sending messages to that effect to the other dockees.

Figure 4:
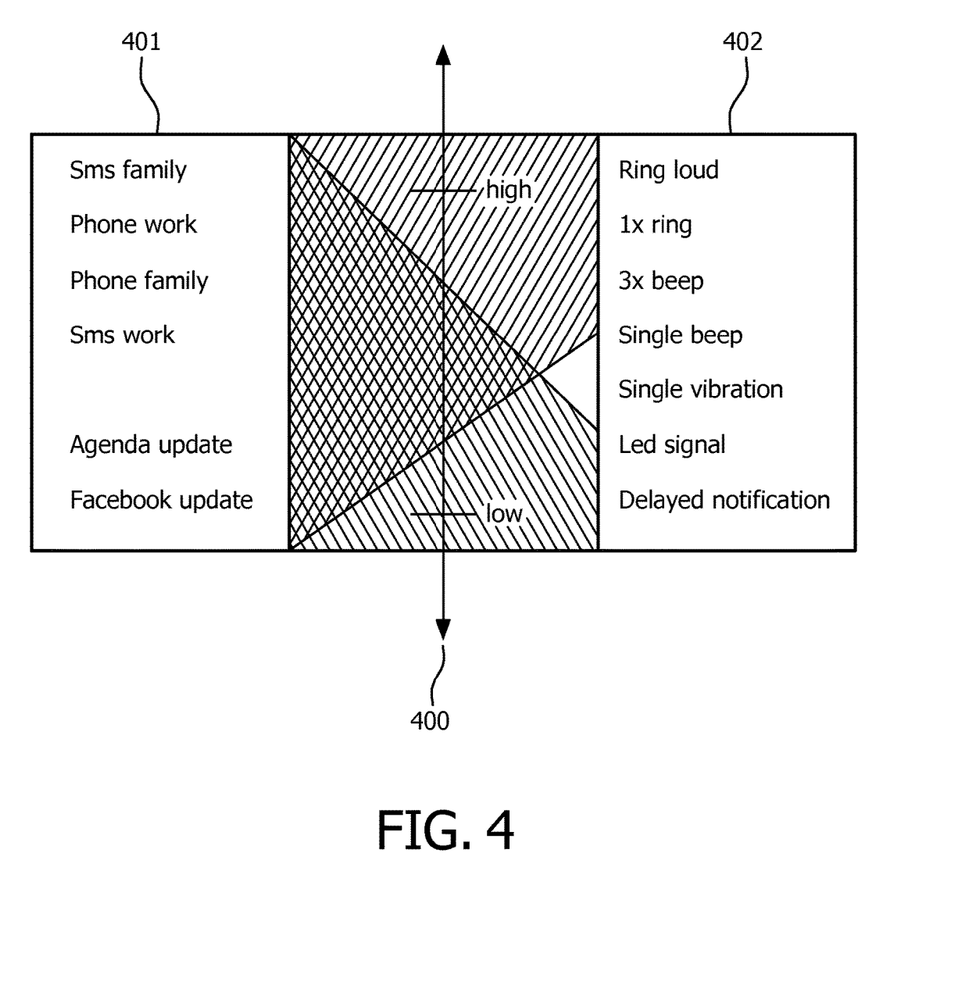
FIG. 4 shows an example of setting permissions in a dockee device.

FIG. 4 shows an example of setting permissions in a dockee device. The Figure sows a diagram of disturbance levels of a dockee phone, ranked from low to high priority in a left column 401, and indicating disturbance signals ranked from low (introvert) to high disturbance level (extrovert) in a right column 402. In a central area setting a disturbance level is depicted by an arrow 400, having a low disturbance level setting "low" and a high disturbance level setting "high". When the disturbance level is set low, the other dockees will enter a low disturbance mode whereby all the phone events are mapped to less disturbing triggers e.g. only visual notifications are given instead of audio notifications when people receive a message (as indicated in FIG. 4). When the disturbance level is high, the smartphone reacts with a more extrovert method on the incoming events. The disturbance level may be changed dynamically, e.g. may start as low at the start of the meeting, but become high again during a break. When a dockee leaves and undocks from the WDH, the disturbance level on the dockee is reset to its original value.

The above setting resolves a problem during meetings/lectures, i.e. that the ringtone of an incoming call disturbs the meeting/lecture. The same situation may occur in open plan offices with flexible workplaces. This is solved by allowing the WDH and/or a further docking device to manage the disturbance level of other dockees. When set low, the dockees will enter a low disturbance mode whereby e.g. only visual notifications are given instead of audio notifications when people receive a message. Hence, such system enables a WDH or dockee to set permission(s) for application features (such as disturbance level or interaction level) on other dockees.

In combination with the above docking system having primary and secondary dockees, the primary dockee/presenter may be provided with means to control some aspects of the meeting, such as the disturbance level or interactivity level. The benefit of doing so, e.g. controlling the disturbance level is that it provides a means to avoid for example hearing the ringtones of incoming phone calls on secondary and/or primary dockees that can typically disturb a meeting or lecture. The benefit of controlling the interaction level is that it provides a means for a lecturer/presenter using a primary dockee to control for example at which time intervals attendees may answer questions to for example a poll/quiz/exam question, and when the secondary dockee users may send messages to one another.

In another embodiment, a dockee automatically looks for specific messages or information elements provided by the WDH, like "disturbance level", e.g. during pre-association device or service discovery, or during docking by using docking protocol messages.

In another embodiment, the WDH or primary dockees can set the interaction level allowed for secondary dockees for a specific or non-determined time interval (e.g. under control of a lecturer/presenter using the WDH or primary dockee for control, or using a predetermined schedule). The interaction level may for example determine when secondary dockees may provide message responses to the WDH, or when the secondary dockee users may send messages to one another.

In another embodiment, the WDH enables primary dockees to make/add a secondary dockee as primary dockee, possibly based on a request coming from the secondary dockee. The primary dockee or secondary dockee may be asked to provide a password for doing so.

In an alternative embodiment, the WDH enables handover of one or more peripheral devices connected to the WDH from one dockee to another, e.g. by using a token (possibly based on near field communication NFC) associated with the peripheral device(s).

In another embodiment, the WDH enables primary dockees to undock all participants from the WDH device. This can be achieved by the primary dockees sending a message to the WDH, e.g. after pressing a button in the primary dockee's user interface, upon which the WDH sends a message to all dockees to undock and/or disconnects all secondary and/or primary dockees. It may also be triggered by the WDH detecting that the primary dockee(s) get disconnected or out of range, or by pressing a button on the WDH.

In further embodiment, the primary dockees will have a unicast connection with the WDH for reliable communication with peripherals attached to the WDH. The WDH will provide bandwidth management to secondary dockees based on bandwidth and error sensitivity of content, by scaling audio/visual data and/or using Wi-Fi broadcast or multicast to save local bandwidth. Content such as real-time messages that requires low bandwidth or non real-time error sensitive data such as documents and programs may be exchanged using unicast connections for reliability reasons.

In another embodiment, the WDH provides an internet gateway for docked devices, i.e. share internet connection, possibly providing firewall functionality.

In a further embodiment, an application running locally on each dockee will take care of presenting data to the user(s), handling interactivity, setting permissions by the user(s), etc. This application may be preinstalled on the dockee or pushed by the WDH or the primary dockees to the secondary dockees (on which it gets downloaded and installed). The latter option allows for customized applications and/or applications extensions (such as plugins, scripts, content) to be used during the meeting and/or to control the meeting/lecture room infrastructure. The application for the primary docking may be different and/or may have more options enabled than the application provided for secondary dockees.

In a further embodiment, a WDH can automatically generate a presence list for user based on dockee devices, and/or user, device or presence statistics based on individual feedback received from the dockees. By comparing actual presence list with expected or invited list it is possible to send important information to those not being present using a global network (for example by E-mail or SMS).

Figure 5:
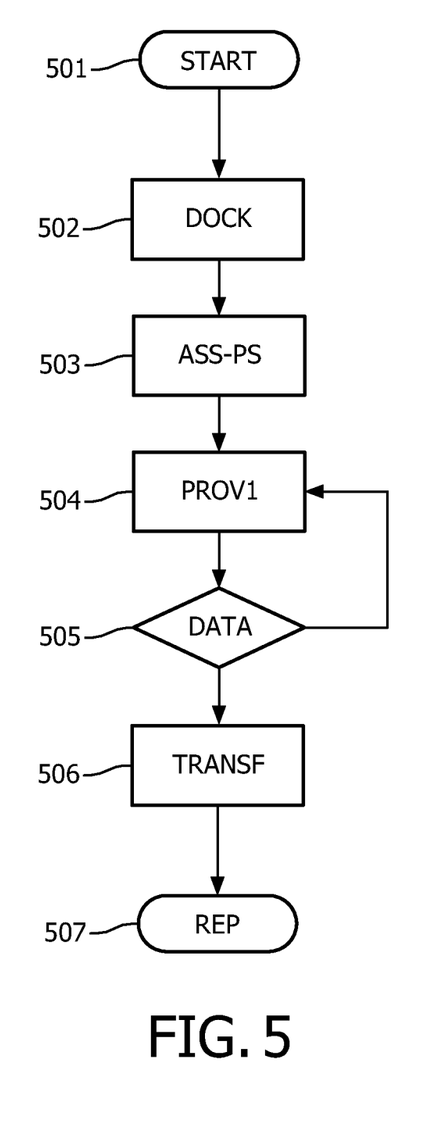
FIG. 5 shows a method of wireless docking at a host device.

FIG. 5 shows a method of wireless docking at a host device. The method enables wireless communication between a host device and multiple dockee devices, the host device being coupled to at least one peripheral for rendering audio or video (AV) data. The host device has a host communication unit for accommodating said wireless communication, and the dockee device has a dockee communication unit for accommodating said wireless communication. The method starts at step START 501, and subsequently at step DOCK 502 at least one dockee device is docked for providing access to the at the least one peripheral for the dockee device. In a step ASS-PS 503, the docking includes assigning a dockee type, i.e. primary or secondary, to the dockee. For a multitude of dockee devices at least one primary dockee device and at least one secondary dockee device are docked. Next at step PROV1 504, to the primary dockee device, control is provided over the at least one peripheral for determining the AV data to be rendered. Next, at step DATA 505 AV data to be rendered is received. Such data is rendered via the respective peripheral. Moreover, when such data is received, at step TRANSF 506, such data is also transferred to the secondary dockee device. Finally, the method is repeated at REP 507, either for docking further devices at step DOCK 502 or to receive further data at step DATA 505.

Figure 6:
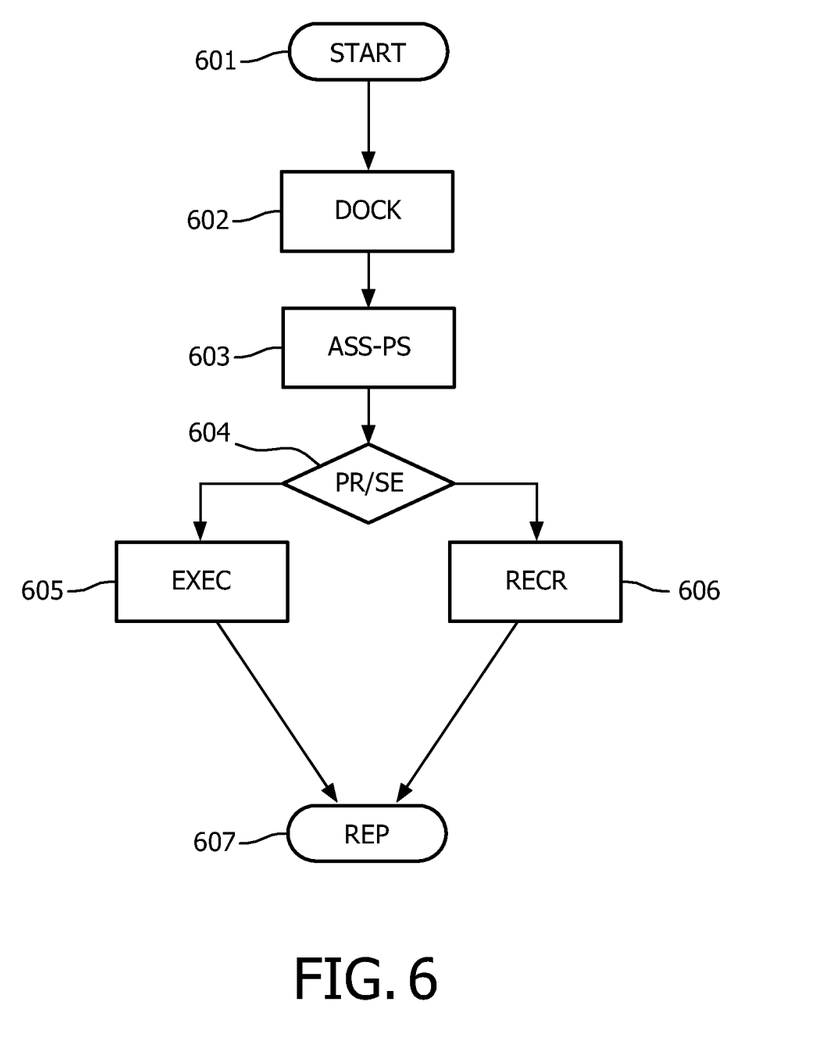
FIG. 6 shows a method of wireless docking at a dockee device.

FIG. 6 shows a method of wireless docking at a dockee device. The method enables wireless communication between a dockee device and a host device, the host device and dockee device being arranged as described with FIG. 5. The method starts at step START 601, and subsequently at step DOCK 602 the dockee device is docked for providing access to the at the least one peripheral for the dockee device. In a step ASS-PS 603, the dockee may receive a dockee type, i.e. primary or secondary, from the host. The dockee may however not be aware of the assignment, and only receive some peripheral functions that are available for the respective type of dockee. Based on the dockee type, as indicated by the selection step PR/SE 604, the primary dockee continues at step EXEC 605, and executes control over the at least one peripheral for determining the AV data to be rendered. Alternatively, at step RECR 606, the secondary dockee device receives and renders the AV data to be rendered via the at least one peripheral. Finally, the method is repeated at REP 607, either for executing control at step EXEC 605 or receiving further data at step RECR 606.

Although the invention has been mainly explained by embodiments using wireless docking, the invention is also suitable for any wireless system where multiple wireless devices need to connect to, or share, one or more peripherals. It is to be noted that the invention may be implemented in hardware and/or software, using programmable components.

It will be appreciated that the above description for clarity has described embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

The invention claimed is:

1. A host device that is coupled to a first peripheral for rendering Audio and/or Video (AV) data, the host device comprising:
   a host communicator that provides wireless communication with dockee devices comprising at least one primary dockee device and at least one secondary dockee device;
   a processor that:
      docks the at least one primary dockee device to the host device;
      docks the at least one secondary dockee device to the host device;
      enables control of the first peripheral to the primary dockee device,
      wherein the primary dockee device controls the first peripheral to determine the AV data that is rendered by the first peripheral;
      enables access to at least part of the AV data by the secondary dockee device;
   wherein the secondary dockee device includes an application feature for selecting one of a plurality of signals that are emitted upon receipt of an external event; and
   wherein, upon instruction from the primary dockee device, the processor controls the application feature of the secondary dockee device to select the signal that is to be emitted by the secondary dockee device upon receipt of the external event, to control a disturbance level of the secondary dockee device.

2. The device as claimed in claim 1, wherein the processor provides the primary dockee device with write access to the first peripheral to determine the AV data that is rendered, and provides the secondary dockee device read access to the at least part of the AV data.

3. The device as claimed in claim 1, wherein the processor is configured for managing a meeting of participants based on docking the at least one primary dockee device and the at least one secondary dockee device that are associated with the coupled to participants, the multiple dockee devices comprising at least one primary dockee device.

4. The device as claimed in claim 3, wherein the processor is configured for at least one of:
   counting a number of participants to the meeting based on the number of dockee devices;
   registering a participant to the meeting based on data received from the dockee device;
   registering at least one presenter corresponding to the primary dockee device;
   distributing meeting data to the participants of the meeting; and
   distributing meeting data as controlled by the primary dockee device.

5. The device as claimed in claim 1, wherein the processor is configured for docking multiple primary dockee devices, and, at least one of:
providing, to the multiple primary dockee devices, shared control over the first peripheral for determining the AV data to be rendered;
managing shared AV output for the multiple primary dockee devices by providing at least one of: split screen, overlaying, at least one window, video scaling, and audio mixing.

6. The device as claimed in claim 1, wherein the processor is configured for, upon instruction of a primary and/or secondary dockee device, at least one of:
assigning the secondary dockee device as the primary dockee device, or assigning the primary dockee device as the secondary dockee device;
accommodating direct communication between two dockee devices;
assigning the multiple dockee devices to a group and accommodating direct communication between the dockee devices of the group;
sharing of content or messages between all dockee devices;
using a local network broadcast; and
content scaling for transferring shared content to the multiple dockee devices.

7. The device as claimed in claim 1, wherein the processor is configured for, upon instruction of a primary dockee device, undocking at least one, a group, or all, of the dockee devices.

8. The device as claimed in claim 1, wherein the first peripheral comprises at least one of:
a beamer, a smartboard, a display screen, a loudspeaker system;
mouse, keyboard, room control unit;
a data storage unit.

9. The host device of claim 1,
wherein the external event comprises receipt of at least one of: a phonecall; a message, an alert, and a notification; and
wherein the plurality of signals includes at least two of: a light, a vibration, a beep, and a ring tone.

10. A dockee device comprising:
a communicator that provides wireless communication with a host device;
wherein the host device provides access to a first peripheral that renders Audio and/or Video (AV) data;
wherein the dockee device is a primary dockee device;
a processor that:
docks the primary dockee device with the host device;
sends a signal to trigger docking of a secondary dockee device to the host device;
wherein the primary dockee device controls the first peripheral to determine the AV data that is rendered;
wherein the secondary dockee device receives at least part of the AV data from the host device;
wherein the secondary dockee device includes an application feature for selecting one of a plurality of signals that are emitted upon receipt of an external event; and
wherein the processor communicates an instruction to the host device to control the application feature of the secondary dockee device to select the signal that is to be emitted upon receipt of the external event, to control a disturbance level of the secondary dockee device.

11. The dockee device of claim 10,
wherein the external event comprises receipt of at least one of: a phonecall; a message, an alert, and a notification; and
wherein the plurality of signals includes at least two of: a light, a vibration, a beep, and a ring tone.

12. A method of wireless communication between a host device and multiple dockee devices, wherein the host device is coupled to a first peripheral for rendering Audio and/or Video (AV) data, the method comprising, at the host device:
docking at least one primary dockee device to the host device;
docking at least one secondary dockee device to the host device;
providing, to the primary dockee device, control over the first peripheral for determining the AV data to be rendered; and
communicating at least part of the AV data to the secondary dockee device;
wherein the secondary dockee device includes an application feature for selecting one of a plurality of signals that are emitted upon receipt of an external event; and
controlling the secondary dockee device by controlling the application feature to select the signal that is to be emitted by the secondary dockee device upon receipt of the external event, thereby controlling a disturbance level for the secondary dockee device.

13. The method of claim 12,
wherein the external event comprises receipt of at least one of: a phonecall; a message, an alert, and a notification; and
wherein the plurality of signals includes at least two of: a light, a vibration, a beep, and a ring tone.

14. A method of wireless communication between a host device and multiple dockee devices, the method comprising, at a primary dockee device:
docking the primary docking device with the host device, wherein the host device is coupled to a first peripheral for rendering Audio and/or Video (AV) data;
sending a signal to trigger docking of a secondary dockee device to the host device;
controlling, by the primary docking device, the first peripheral to determine the AV data that is rendered;
wherein the secondary dockee device receives at least part of the AV data from the host device;
wherein the secondary dockee device includes an application feature for selecting one of a plurality of signals that are emitted upon receipt of an external event; and
communicating, from the primary docking device, an instruction to the host device to control the application feature of the secondary dockee device to select the signal that is to be emitted upon receipt of the external event, to control a disturbance level of the secondary dockee device.

15. The method of claim 14,
wherein the external event comprises receipt of at least one of: a phonecall; a message, an alert, and a notification; and
wherein the plurality of signals includes at least two of: a light, a vibration, a beep, and a ring tone.

16. A non-transitory computer readable medium comprising a program that, when executed by a processing system on a host device, causes the processing system to:
dock at least one primary dockee device to the host device;
dock at least one secondary dockee device to the host device;

provide, to the primary dockee device, control over the first peripheral for determining Audio and/or Video (AV) data to be rendered; and communicating at least part of the AV data to the secondary dockee device;
- wherein the secondary dockee device includes an application feature for selecting one of a plurality of signals that are emitted upon receipt of an external event; and controlling the secondary dockee device by controlling the application feature to select the signal that is to be emitted by the secondary dockee device upon receipt of the external event, thereby controlling a disturbance level for the secondary dockee device.

17. The non-transitory computer-readable medium of claim 16,
- wherein the external event comprises receipt of at least one of: a phonecall; a message, an alert, and a notification; and
- wherein the plurality of signals includes at least two of: a light, a vibration, a beep, and a ring tone.

* * * * *